Patented Sept. 25, 1928.

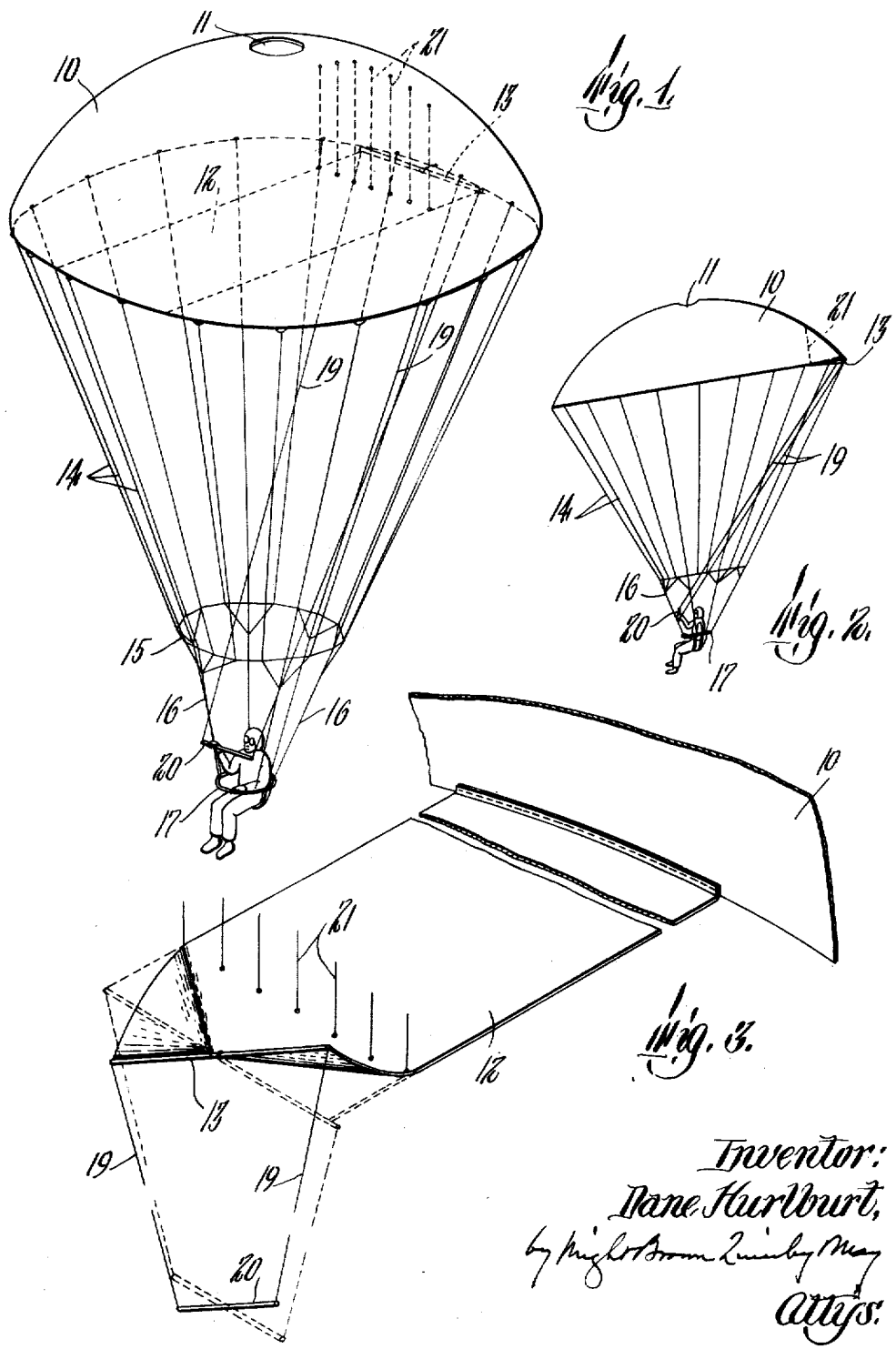

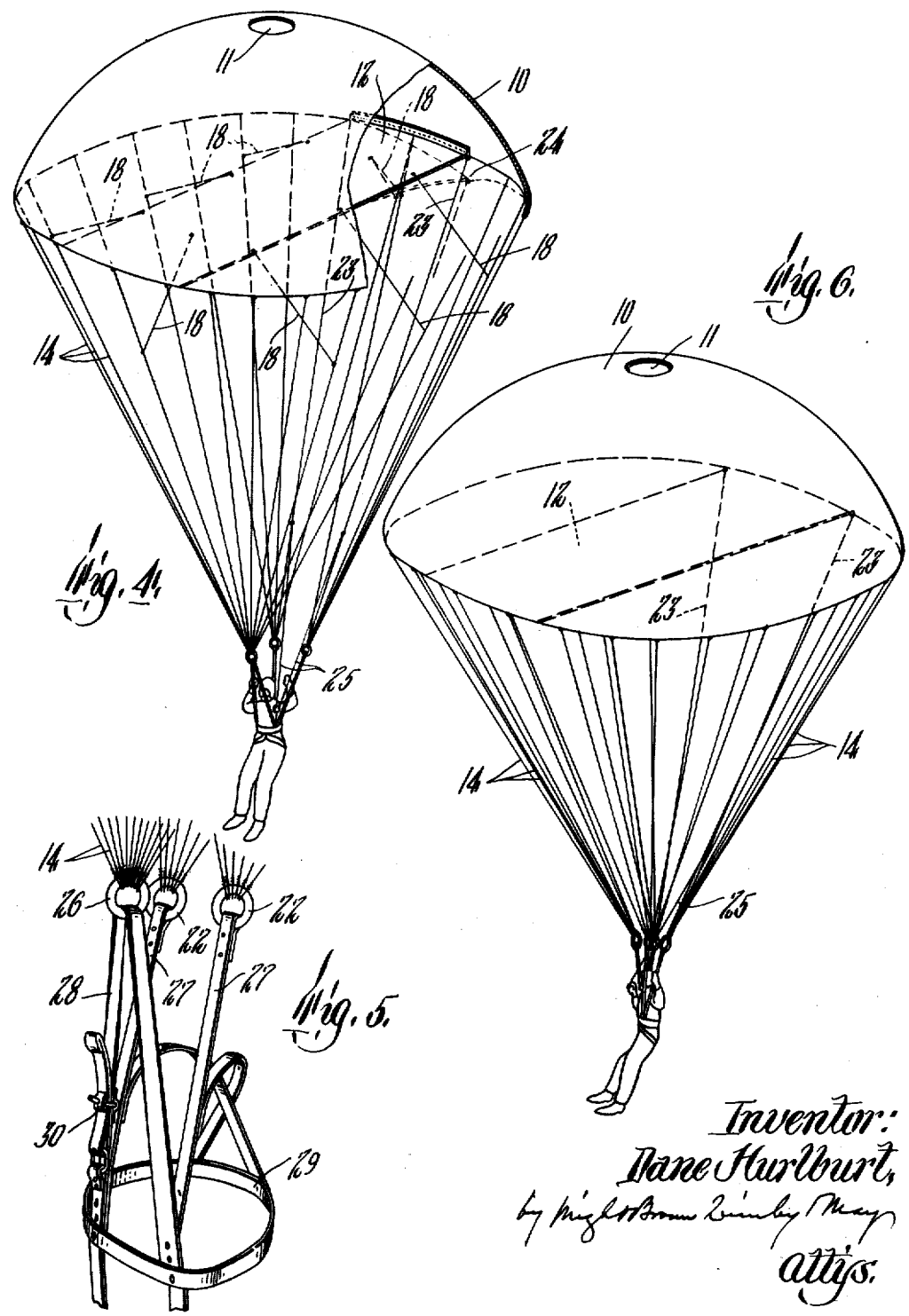

1,685,422

UNITED STATES PATENT OFFICE.

DANE HURLBURT, OF CANNES, FRANCE.

PARACHUTE.

Application filed December 9, 1925. Serial No. 74,315.

This invention relates to a device for causing a lateral glide by a parachute in the course of its descent and for turning the parachute in order to control the direction of the glide.

Parachutes have long been in use, and since the development of aviation have become an essential part of an aviator's equipment. When it becomes necessary to resort to the parachute, the aviator often has little or no time to pick a favorable landing place before jumping. In the course of the descent, it is important to guide the parachute clear of objects which would add to the hazard of landing. It is frequently attempted to guide a parachute by pulling on certain of the shroud lines, but this practice is difficult and unsatisfactory.

The present invention is designed to permit the operator to cause a side-slip of the parachute at any time during its descent, means being provided to turn the parachute on its vertical axis in either direction so as to control the direction of the slip. The attachment for accomplishing these results adds little to the weight or bulk of the folded parachute and enables the operator easily to glide a considerable distance in any desired direction and thus to avoid dangerous landings.

The advantageous combinations and features of the device will be apparent from the disclosure thereof in the drawing, in which,—

Fig. 1 is a perspective of an open parachute showing the disposition of one form of my gliding and steering device therein;

Fig. 2 is a side view of the parachute and apparatus;

Fig. 3 is a detail on a larger scale of the device for gliding and turning the parachute;

Fig. 4 is a modified form of my gliding and steering device;

Fig. 5 is a detail showing the operator's harness and method of attaching risers thereto; and Fig. 6 illustrates another modified form of my device as an attachment applied to a standard army parachute.

It is to be understood that the description of the parachute and the members associated therewith contained in the specification and the references thereto in the claims are to be taken as referring to the parachute in the course of descent. It is also to be understood that the term "parachute" as used in the specification and claims is meant to refer only to the fabric element which offers a large surface to air resistance during a descent, and not to the ropes or other paraphernalia attached thereto.

Referring to the drawing in detail, 10 represents the parachute itself, which is preferably of a standard type and constructed of any desired fabric. The usual aperture in the top is indicated at 11. According to the invention, a substantially plane elongated surface member is disposed horizontally beneath the parachute and diametrically thereof. Means are provided to tilt this surface member longitudinally so as to present it at an angle to the upward pressure of the air caused by the descent of the parachute with its attachments. A side slip or glide is thus produced in the direction of the low end of the tilted surface member. This invention further provides means for so manipulating the surface member to cause the parachute to turn on a vertical axis so as to orient it longitudinally in any desired direction. This is preferably accomplished by warping twisting or otherwise deforming the surface.

In the embodiment of the invention illustrated in Fig. 1, the gliding surface may be formed by an elongated sheet or strip 12 of light material, such, for example, as that commonly used in the parachute itself. The strip 12 may be attached at one of its ends to the parachute by a horizontal seam along a portion of the edge of the parachute. The other end of the strip is preferably secured to a rod 13 of comparatively rigid material, that is, sufficiently rigid to hold the end of the strip 12 substantially straight against the ordinary stresses imposed upon it. It is also desirable to have a material flexible and resilient enough to enable the rod 13 to be contained in the standard sized package into which parachutes are customarily made up. The rod 13 is preferably secured at its center point only to the edge of the parachute at such a point that the strip 12 will extend diametrically from one side of the parachute to the other.

The customary shrouds 14 extend from the edge of the parachute to a ring 15 from which suitable risers 16 (six being shown in the drawing) descend to a smaller ring 17 which encircles the operator and is attached to his harness at two points only, preferably at the sides of the operator. This mode of attachment of the ring 17 permits it to turn on a horizontal axis. By manipulating this ring, it will readily be seen that the operator can lower the front portion of the parachute relative to the rear portion, and thus tilt the gliding surface attached thereto. In order to keep the gliding surface substantially flat, stays 18 (Fig. 4) may be attached to the strip 12 at a number of points and preferably secured to convenient shrouds. To provide for the steering effect, control ropes 19 may be secured to the ends of the rod 13 and brought down within the operator's reach so as to be actuable from the body supported by the parachute, the term "body" in this case including the harness, or operator or other load. As shown in the drawing, the control ropes are attached to a light bar 20 which may be grasped by the operator. Manipulation of the bar 20 will turn the rod 13 on its point of support and thus warp or twist the strip 12. If desired, a number of supporting ropes 21 may be attached to the strip in a transverse line at a suitable distance from the rod 13 and led vertically upwards to the parachute, the function of these ropes being to limit the warping effect to the end portion of the strip 12, but the ropes 21 are not necessary for successful operation. The stays 18 can also be omitted, but without them the strip is liable to bulge upwardly within the parachute and thus lose a great deal of its effectiveness as a gliding and steering means.

In operating this form of the invention, the operator descends vertically until he wishes to glide. By bearing on the front of the ring 17 with one hand, he tilts the strip 12 and causes a forward glide. By manipulating the bar 20 he can cause the parachute to turn on its vertical axis and thus glide in any desired direction by orienting himself to that direction.

In the form of the invention shown in Figs. 4 and 6, the strip 12 is preferably sewed to the edge of the parachute at both ends. The shrouds 14 are secured to grommets 22 which are connected to the operator's harness by risers. Manipulation of the risers causes the strip to tilt and glide, the warping of the strip being effected by drawing on either one of the shrouds 23 which join the edge of the parachute where the corners at the rear end of the strip are attached. A pull on one of the shrouds 23 draws the corresponding corner of the strip down to the position 24 shown by the dotted lines in Fig. 4. The shrouds 23 may be selectively pulled by means of a cord 25 threaded through an eye located in a convenient place in the harness or elsewhere and having its ends attached respectively to the shrouds 23 at a suitable height. If desired, the ends of the cord 25 may be extended up and attached to the edge of the parachute.

Figures 4 and 6 illustrate two ways of controlling the tilt of the strip. In the former, half of the shrouds are led down to a single grommet 26, as shown in Fig. 5, the other half of the shrouds being divided as usual between two grommets 22, to each of which is attached a riser 27. Through the grommet 26 is passed a riser 28, both ends of which are attached to the operator's harness 29. By means of a clamp or buckle 30 the riser 28 may be shortened, thus drawing on shrouds which are attached to the grommet 26. The strip 12, having its forward end attached to the mid-portion of the semicircular edge of the parachute supporting these shrouds, is thus tilted longitudinally when the riser 28 is shortened. It thereupon produces a gliding effect and by manipulation of the cord 25 may be warped at its rear end to orient the parachute and direct the glide. In this form of the device, the operator faces in the longitudinal direction of the strip 12 and thus in the direction of glide.

In the form illustrated in Fig. 6, four risers are attached to the harness in the usual way, each being connected to the shrouds from a quadrant of the parachute. Means is provided, such as a clasp or buckle, for shortening one of the risers connected to a forward quadrant to enable the operator to hold that quadrant depressed. Since the forward end of the strip 12 should be attached symmetrically with respect to the depressed quadrant, it will have a position diagonal to the direction in which the operator faces, as shown in Fig. 6. The glide will as in the other forms of the invention, be in the longitudinal direction of the strip. As in the form shown in Fig. 4, steering is preferably effected by pulling down one of the rear corners of the strip 12 by means of a cord 25, as hereinbefore described.

After the adjustable riser has been shortened by the operator to effect a glide, it will be held by the clamp 30, or other similar device, and leave the operator free to control the direction of the glide by easy manipulation of the cord 25. When it is desired to resume vertical descent (with respect to the air) the clasp 30 is released, allowing the shortened riser to resume normal length.

It is evident that many other changes and modifications might be made without departing from the spirit or scope of this invention as defined by the appended claims.

I claim:

1. In combination, a parachute, an elongated sheet disposed beneath the parachute having its ends secured to the parachute respectively at opposite edge portions thereof, and means for tilting said sheet from horizontal position.

2. In combination with a parachute having shrouds, means actuable to cause a glide during descent, comprising an elongated sheet extending beneath the parachute between opposite edges thereof, and means for maintaining said sheet substantially flat, said maintaining means comprising stays extending from a plurality of points on the lower surface of the strip to certain of the shrouds.

3. In combination with a parachute, means actuable to cause a glide during descent and for causing the parachute to turn on a vertical axis comprising an elongated sheet secured along one end to the edge of the parachute and along its other end to a comparatively rigid member, said member being secured at its midpoint only to the edge of the parachute so that the sheet is disposed diametrically across and beneath the parachute, control ropes attached to the ends of said comparatively rigid member, and a plurality of supporting ropes extending from the parachute to points on said sheet spaced from said comparatively rigid member and in a line substantially parallel thereto.

4. The combination with a parachute, of means actuable to tilt the plane of the edge of the parachute from the horizontal during descent and to cause said parachute to have a high side and a low side, and actuable to cause said parachute to turn on its vertical axis, comprising a flat strip of flexible material disposed beneath the parachute, one end of said strip being secured along the edge of the parachute at one side, the other end of said strip having a comparatively rigid member secured thereto, the midpoint of said comparatively rigid member being attached to the edge of the parachute at its opposite side, control ropes attached to the ends of the comparatively rigid member, and supporting ropes extending from the parachute to points on the strip in a line spaced from the comparatively rigid member and substantially parallel thereto.

5. In combination with a parachute, means actuable to cause the parachute to turn selectively in either direction on a vertical axis, said means comprising a strip of sheet material extending beneath the parachute from one side to the other, and means for twisting an end portion of said strip, comprising control ropes attached to the corners of the strip at said end thereof.

6. In combination with a parachute, a flexible strip extending underneath the parachute from one side to the other thereof, and means for bending one portion of said strip relatively to the remainder of the strip.

7. In combination with a parachute, a flexible strip extending underneath the parachute and substantially parallel to the plane of the edge of the parachute, and means for bending one portion of said strip relatively to the remaining portion.

8. In combination with a parachute, a strip of flexible material extending from one side to the other thereof, and means for moving an end portion of said strip out of the general plane of the strip.

9. In combination with a parachute, a strip of flexible material extending beneath the parachute substantially in the plane of the edge thereof and attached to the parachute at both ends and along a transverse line intermediate the ends, and means for turning one of said ends relatively to the other.

10. In combination with a parachute, means for suspending a body therefrom, a gliding member disposed beneath said parachute and adjustable to tilt from the horizontal, said member being actuable from said body to wrap an end thereof to effect a turning movement of said parachute about a vertical axis.

11. In combination with a parachute, a normally horizontal elongated plane member, means for tilting said member longitudinally, and means for wraping an end of said member when so tilted.

In testimony whereof I have affixed my signature.

DANE HURLBURT.

---

CERTIFICATE OF CORRECTION.

Patent No. 1,685,422.   Granted September 25, 1928, to

DANE HURLBURT.

It is hereby certified that error appears in the printed specification of the above numbered patent requiring correction as follows: Page 3, line 74, claim 10, for the word "wrap" read "warp" and line 80, claim 11, for "wraping" read "warping"; and that the said Letters Patent should be read with these corrections therein that the same may conform to the record of the case in the Patent Office.

Signed and sealed this 6th day of November, A. D. 1928.

(Seal)

M. J. Moore,
Acting Commissioner of Patents.

3. In combination with a parachute, means actuable to cause a glide during descent and for causing the parachute to turn on a vertical axis comprising an elongated sheet secured along one end to the edge of the parachute and along its other end to a comparatively rigid member, said member being secured at its midpoint only to the edge of the parachute so that the sheet is disposed diametrically across and beneath the parachute, control ropes attached to the ends of said comparatively rigid member, and a plurality of supporting ropes extending from the parachute to points on said sheet spaced from said comparatively rigid member and in a line substantially parallel thereto.

4. The combination with a parachute, of means actuable to tilt the plane of the edge of the parachute from the horizontal during descent and to cause said parachute to have a high side and a low side, and actuable to cause said parachute to turn on its vertical axis, comprising a flat strip of flexible material disposed beneath the parachute, one end of said strip being secured along the edge of the parachute at one side, the other end of said strip having a comparatively rigid member secured thereto, the midpoint of said comparatively rigid member being attached to the edge of the parachute at its opposite side, control ropes attached to the ends of the comparatively rigid member, and supporting ropes extending from the parachute to points on the strip in a line spaced from the comparatively rigid member and substantially parallel thereto.

5. In combination with a parachute, means actuable to cause the parachute to turn selectively in either direction on a vertical axis, said means comprising a strip of sheet material extending beneath the parachute from one side to the other, and means for twisting an end portion of said strip, comprising control ropes attached to the corners of the strip at said end thereof.

6. In combination with a parachute, a flexible strip extending underneath the parachute from one side to the other thereof, and means for bending one portion of said strip relatively to the remainder of the strip.

7. In combination with a parachute, a flexible strip extending underneath the parachute and substantially parallel to the plane of the edge of the parachute, and means for bending one portion of said strip relatively to the remaining portion.

8. In combination with a parachute, a strip of flexible material extending from one side to the other thereof, and means for moving an end portion of said strip out of the general plane of the strip.

9. In combination with a parachute, a strip of flexible material extending beneath the parachute substantially in the plane of the edge thereof and attached to the parachute at both ends and along a transverse line intermediate the ends, and means for turning one of said ends relatively to the other.

10. In combination with a parachute, means for suspending a body therefrom, a gliding member disposed beneath said parachute and adjustable to tilt from the horizontal, said member being actuable from said body to wrap an end thereof to effect a turning movement of said parachute about a vertical axis.

11. In combination with a parachute, a normally horizontal elongated plane member, means for tilting said member longitudinally, and means for wraping an end of said member when so tilted.

In testimony whereof I have affixed my signature.

DANE HURLBURT.

CERTIFICATE OF CORRECTION.

Patent No. 1,685,422.  Granted September 25, 1928, to

DANE HURLBURT.

It is hereby certified that error appears in the printed specification of the above numbered patent requiring correction as follows: Page 3, line 74, claim 10, for the word "wrap" read "warp" and line 80, claim 11, for "wraping" read "warping"; and that the said Letters Patent should be read with these corrections therein that the same may conform to the record of the case in the Patent Office.

Signed and sealed this 6th day of November, A. D. 1928.

(Seal)

M. J. Moore,
Acting Commissioner of Patents.